United States Patent [11] 3,610,851

| [72] | Inventor | Anthony L. Krupski<br>17201 Gumbiner Drive, Valinda, Calif. 91744 |
|---|---|---|
| [21] | Appl. No. | 859,439 |
| [22] | Filed | Sept. 19, 1969 |
| [45] | Patented | Oct. 5, 1971 |

[54] TIRE DEFLATION WARNING SIGNAL APPARATUS
5 Claims, 5 Drawing Figs.

[52] U.S. Cl. .................................................. 200/61.24, 340/58
[51] Int. Cl. ................................................. H01h 35/00
[50] Field of Search ........................................... 200/61.22, 61.23, 61.24, 61.44; 340/58; 116/34

[56] References Cited
UNITED STATES PATENTS

| 2,258,334 | 10/1941 | Miller .......................... | 200/61.24 |
| 2,640,119 | 5/1953 | Bradford ...................... | 200/61.24 |

FOREIGN PATENTS

| 634,972 | 12/1927 | France .......................... | 200/61.23 |

Primary Examiner—Robert K. Schaefer
Assistant Examiner—M. Ginsburg
Attorney—J. C. Baisch ABSTRACT: Switch apparatus for an electrical tire deflation warning system for vehicles having pneumatic tires. The switch is actuated automatically when a tire becomes underinflated to warn the operator that the tire pressure is low and the tire requires attention. The switches of the electrical system re mounted adjacent the wheels of the vehicle and have movable contact switch members which are automatically actuated to energize a visual and/or auditory signal by engagement with the ground or road surface as the part of the vehicle supported by the tire becomes lower than normal, and/or by being engaged by the sidewall of the adjacent tire as the tire pressure becomes low and the ground-engaging part of the tire flattens or spreads out. The movable contact member of the switch is adapted to contact a fixed contact member to close the switch when the movable switch contact member is moved or swung from the normal open position in any direction.

PATENTED OCT 5 1971
3,610,851
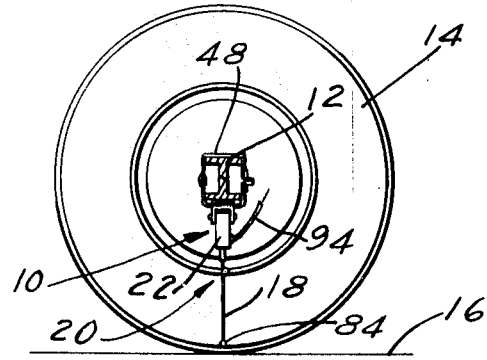
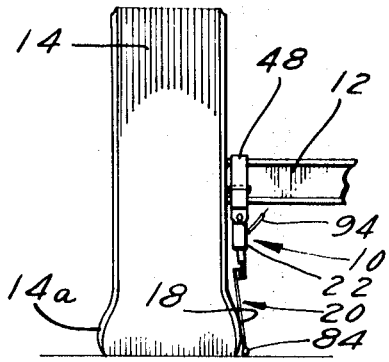
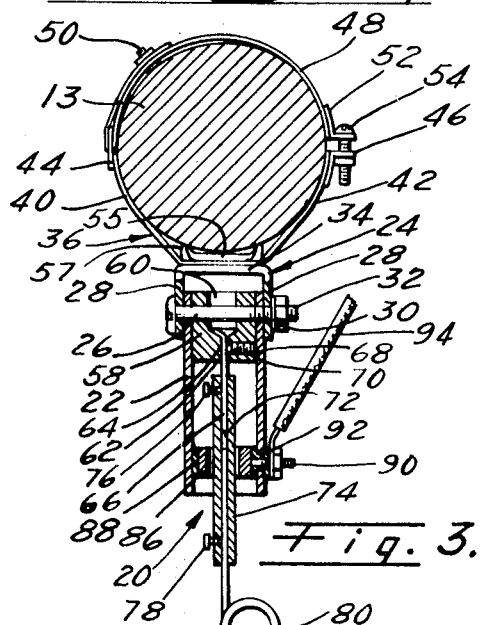
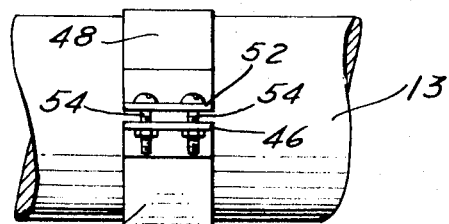
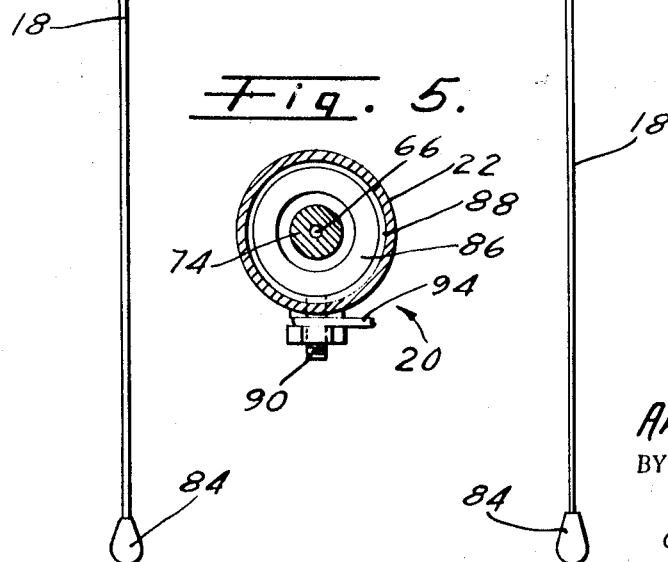
INVENTOR.
Anthony L. Krupski
BY J.C. Baisch
Attorney

3,610,851

TIRE DEFLATION WARNING SIGNAL APPARATUS

BACKGROUND OF THE INVENTION

1. Field of the Invention

This invention relates to switches for electrical signal systems, in motor vehicles equipped with pneumatic tires, for warning the operator when any of the tires of the vehicle becomes under-inflated and needs attention.

2. Description of the Prior Art

I am aware that various devices have been proposed having this for their object but these are not entirely satisfactory. For example, none, as far as I am aware, are or can be actuated by the wall of the tire when the latter spreads with a drop in air pressure.

SUMMARY OF THE INVENTION

The present invention comprises a switch apparatus for electrical signal systems that may be easily and quickly attached to respective parts of the vehicle adjacent the tires. For example, the switch may be attached to an axle or axle housing. There is a movable switch member adjacent a tire and adapted to be contacted by the wall of the tire when the wall of the tire spreads as air is lost from the tire and it becomes under-inflated. This movable switch member is also positioned with respect to the road or pavement surface so that said movable switch member is adapted to contact the road or pavement surface and be pivoted or moved to a closed position, that is the switch closes the electric circuit so that an alarm signal, visual or auditory or both, will be given apprising the operator that the tire has become under-inflated and requires attention.

OBJECTS AND ADVANTAGES OF THE INVENTION

It is an object of the invention to provide a switch, for electrical warning signal systems for vehicles having pneumatic tires, that has a movable switch member adapted to close the electric circuit by movement of said movable switch member laterally, as well as in the direction of movement of the vehicle.

Another object of the invention is to provide a switch of this character that is closed by movement of the movable switch member in any direction throughout 360°.

Still another object of the invention is to provide a switch of this character that has means for adjusting the sensitivity of the switch.

A further object of the invention is to provide a switch of this character that has a movable switch member having a height adjustment.

A still further object of the invention is to provide a switch of this character that may be attached to parts of vehicles of different shapes, as a round part, or a square part and the like.

Another object of the invention is to provide a switch of this character that is simple in construction and that is reliable in operation.

The characteristics and advantages of the invention are further sufficiently referred to in connection with the following detailed description of the accompanying drawings, which represent one embodiment. After considering this example, skilled persons will understand that many variations may be made without department from the principles disclosed and I contemplate the employment of any structures, arrangements or moves of operation that are properly within the scope of the appended claims.

BRIEF DESCRIPTION OF THE DRAWINGS

Referring to the drawings, which are for illustrative purposes only:

FIG. 1 is a sectional view through an I-beam axle showing a side elevational view of the invention attached thereto, the tire pressure being normal;

FIG. 2 is a view taken at right angles to the view of FIG. 1 but with the tire under-inflated and the movable switch member or probe moved laterally to a closed position by the flattened portion of the tire;

FIG. 3 is an enlarged sectional view of the switch attached to a rounded part of the vehicle;

FIG. 4 is a side elevational view of the apparatus as shown in FIG. 3; and

FIG. 5 is an enlarged sectional view taken on line 5—5 of FIG. 4.

DESCRIPTION OF THE PREFERRED EMBODIMENT

Referring more particularly to the drawings, there is shown apparatus, indicated generally at 10, embodying my invention attached to an I-beam type of axle 12 and positioned in operative relationship to a tire 14 and to the road surface 16, the tire being normally inflated so that the lower free end of the feeler 18 of the movable switch member, indicated generally at 20, is spaced from said road surface and from the adjacent wall of the tire 14.

Detailed description of the invention will be made with special reference to FIGS. 3, 4 and 5. The apparatus comprises a hollow housing 22 which is shown as being cylindrical or circular in cross section, although it may be of any other suitable cross-sectional shape. The upper end of the housing 22 is attached to an inverted U-shaped bracket, indicated generally at 24, by means of a screw 26 extending diametrically through the housing and received in aligned openings provided therein, and through aligned openings provided therefor in the depending substantially parallel and spaced arms 28 of the bracket 24, said screw 26 having a securing nut 30 on the threaded free end 32 thereof.

Bracket 24 has a horizontal part 34 connecting the arms 28 together and there is a flexible metal band, indicated generally at 36, secured to said horizontal part 34 by any suitable means such as, for example, welding, brazing or the like, a central portion of said band being secured to said horizontal part 34 of the bracket 24. The band 36 has portions 40 and 42 at opposite sides of the bracket. Portion 40 has a reinforcing piece 44 secured to the end portion thereof by any suitable means such as, for example brazing, welding or the like and there is a slot, not shown, in said piece and end portion of said band. The portion 42 of said band 36 has an angular reinforcing piece 46 secured to said portion 42 by welding, brazing or other suitable means.

Portions 40 and 42 of the band 36 are adapted to pass upwardly at opposite sides of the axle 13 to which the apparatus is attached and there is a strap 48 that passes over the top of the axle and secures the ends of the portions 40 and 42 together.

One end of the strap has a reduced width part that extends through the slot in the free end of portion 40 of the band and is bent back onto itself, and the free end thereof is secured to an adjacent part of the strap by a screw 50. The opposite free end of the strap 48 is provided with an angular reinforcing piece 52 similar to the angular reinforcing piece 46 and secured by brazing, welding or other suitable means, each of the reinforcing pieces having outwardly extending parts which are spaced apart in substantially parallel relationship and provided with aligned holes therein for reception of screws 54 for tightening the strap and band on the axle.

Because of the flexibility of the band and strap, the apparatus is readily attachable to either the I-beam type of structure that essentially has square corners, FIGS. 1 and 2, or the round type of axle, such as shown at 13 in FIG. 3.

A gripping member 55 is secured to the part of the band 36 secured to the horizontal part 34 of the bracket 24 by welding, brazing or other suitable means, and said gripping member has upwardly extending parallel teeth 57 that are spaced apart and grippingly engage the axle to which the switch apparatus is attached.

Within the upper portion of the housing 22, and secured in position by screw 26, is a block 58 of electrical-conducting material, such as steel or other suitable metal. The block 58 has a recess 60 extending downwardly from the top. The recess 60 is somewhat closed at the lower end by a wall 62 which has a vertical opening or bore 64 therethrough in which is received an upper end portion of a flexible and resilient rod 66 of the movable switch member 20. A short length of the rod 66 extends into the recess 60 and is bent laterally to prevent downward displacement of the rod, there being a screw 70 in a tapped opening provided therefor in the block 58, said screw having a pointed inner end for engagement with the part of the rod 66 disposed in the opening 64 for securing the rod in said opening.

A lower end portion of the rod 66 is disposed in a bore 72 extending longitudinally in a sleeve 74 having an upper part that extends axially into the lower part of the housing, a lower part of the sleeve extending below the housing. Rod 66 is secured in said sleeve by a screw 76.

Feeler 18 is also flexible and has an upper end part that also extends into a lower portion of the bore 72 of the sleeve 74 and is secured therein by a screw 78. Adjacent the sleeve, the feeler 18 has a spirally coiled part 80 that gives greater flexibility to said feeler, and the lower end of the feeler is provided with a road surface engaging knob 84.

Within the housing 22 and adjacent the lower end there is disposed a circular contact 86 insulated from the housing by a collar 88 of insulating material. The collar and circular contact are secured within the housing by a screw 90 which is secured to the circular contact by any suitable means such as brazing, welding or the like. The screw 90 is insulated from the housing by insulating material 92 and said screw 90 has an electric wire 94 attached thereto, said wire 94 being part of the electrical circuit, now shown, controlled by the switch apparatus 10. It will be apparent that, in whichever lateral direction the feeler is moved, the sleeve 74 is moved into contact with the circular contact 86.

With the switch apparatus attached to a part of the vehicle adjacent a tire, as shown in FIGS. 1 and 2, the knob 84 is spaced from the adjacent road surface 16 and the adjacent wall of the tire when the tire is properly inflated. Should the tire become under-inflated, the knob 84 is adapted to come into contact with the road surface 16 and cause the feeler and the sleeve 74 to pivot from the upper end of the rod 66 and contact the circular contact 86 to complete or close the electric circuit and energize a visual and/or auditory alarm, so that the operator of the vehicle will know or become aware that the pressure in the tire has dropped to a value whereat damage to the tire will result upon a further drop in said pressure.

Under some conditions, when the tire becomes under-inflated the spreading of the portion 14a of the tire engaging the surface of the road will cause the wall of the tire adjacent the feeler to engage said feeler and push same out of its normal inoperative position to a position whereat the sleeve 74 will contact the circular contact 86 to set off the alarm.

It is to be understood that the sleeve 74 of the movable contact member is grounded since the sleeve is connected to ground through the rod, block, housing and band 36. The fixed contact switch member or circular contact 86 is connected into the electrical system or circuit of the alarm by the wire 94.

The sensitivity of the switch is adjustable by loosening the screw 76, adjusting the rod 66 in the bore 72 of the sleeve and tightening said screw 76.

The effective length of the feeler is adjusted by loosening the screw 78, adjusting the feeler so that the knob 84 is spaced the desired distance from the road surface 16 and the screw 78 tightened.

I claim:

1. Tire deflation warning signal switch apparatus for vehicles having pneumatic tires, comprising:
   A. a hollow housing for attachment to a part of a vehicle adjacent to a pneumatic tire thereof;
   B. a resilient, movable switch member;
   C. means for swingable mounting said movable switch member at its upper end with a lower contacting portion depending within the housing and a further lower portion thereof depending from said housing;
   D. and a circular, fixed switch member mounted within said housing through which said movable switch member extends with the contacting portion centrally disposed within said circular switch member;
   E. a free end portion of said further lower portion being adapted to be positioned adjacent a pneumatic tire for engagement thereby to effect lateral movement of said movable switch member for contact with said fixed switch member whereby the switch is closed.

2. The invention defined by claim 1, wherein the free end portion of said movable switch member is also adapted to be operably positioned adjacent the surface of the road, the apparatus being mounted on the vehicle so as to contact said road surface when the tire becomes under-inflated to thereby effect closing of the switch.

3. The invention defined by claim 2, wherein said means for swingably mounting the upper end of of said movable switch member comprises a block secured within the housing, said block having a recess extending from the top downwardly and having a bottom wall with a bore therethrough, an upper end portion of the movable switch member extending through said bore and into said recess, an end portion of said movable switch member being bent laterally in the recess and means for securing said end portion of said movable switch member in said recess.

4. The invention defined by claim 3, including a flexible means for attaching the deflation warning signal switch apparatus to parts of a vehicle having various cross-sectional configurations, said flexible means comprising:
   A. a flexible band;
   B. an inverted U-shaped bracket secured to and depending from said band and having downwardly depending parallel-spaced arms, said hollow housing being secured therebetween for movable adjustment with respect to said bracket.

5. The invention defined by claim 4, wherein the movable switch member includes a flexible rod at the upper end, the upper end of said rod being swingably mounted, a sleeve having a bore therethrough, a lower portion of said rod being adjustably disposed within said bore, means for securing said rod portion in adjusted positions; a feeler having an upper portion disposed in said bore, said feeler being flexible and having a portion thereof spirally coiled, the sleeve being disposed in the circular, fixed switch contact member normally in substantially axial relationship.